July 18, 1967  L. L. KRAMER  3,331,463

MOTOR OPERATED AMBULATORY VEHICLE

Filed Dec. 14, 1964  2 Sheets-Sheet 1

INVENTOR
*Lyle L. Kramer*

July 18, 1967            L. L. KRAMER            3,331,463

MOTOR OPERATED AMBULATORY VEHICLE

Filed Dec. 14, 1964            2 Sheets-Sheet 2

INVENTOR
Lyle L. Kramer

United States Patent Office 3,331,463
Patented July 18, 1967

3,331,463
MOTOR OPERATED AMBULATORY VEHICLE
Lyle L. Kramer, Box 103, Golconda, Nev. 89414
Substituted for abandoned application Ser. No. 210,484, July 17, 1962. This application Dec. 14, 1964, Ser. No. 420,247
4 Claims. (Cl. 180—8)

This unique invention relates to vehicles, and more particularly to an ambulatory vehicle that is driven by a motor.

Ambulatory is defined in the dictionary as "relating to walking." In other words, something that walks. Therefore, an ambulatory vehicle is one that walks rather than moves on wheels or endless tracks.

Although the motor vehicle as we know it today has reached an admittedly high degree of efficiency in its ability to travel over nearly any kind of terrain on its wheels, there still are many places on this earth where it simply cannot go by reason of extremely uneven ground that is not stable enough for wheeled vehicles nor of the proper consistency to support floating craft.

It is, therefore, the principal purpose of this invention to provide a motor operated ambulatory vehicle that can move on any kind of terrain, no matter how uneven or unstable it may be.

Another purpose of this invention is to provide a motor operated ambulatory vehicle that can be manufactured in any size, from a miniature to a large freight carrier or a multi-passenger vehicle.

Another purpose of this invention is to provide a motor operated ambulatory vehicle that will move forward over any terrain that may be covered with vertically extending obstructions.

Another purpose of this invention is to provide a motor operated ambulatory vehicle of the character described that will be ideal for travel over the terrain of other planets and the like.

Another purpose of this invention is to provide a motor ambulatory vehicle that is ideally suited for military use in jungles and the like by reason of its usual walking motion and the fact that it does not depend upon any pneumatic tires or the like.

Still another purpose of this invention is to provide a motor operated ambulatory vehicle that can be made as a toy having either a spring or electric motor.

The foregoing and other purposes and advantages of the present invention will appear from the following detailed description taken in connection with the accompanying drawing, in which.

Similar reference characters refer to similar parts throughout the several views of the drawing.

Figure 5:
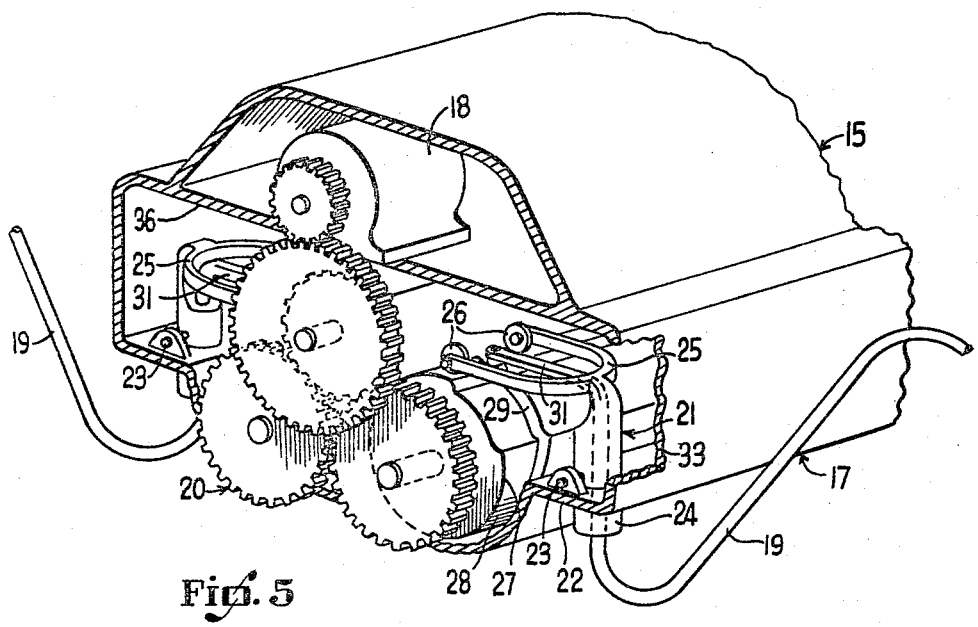
FIGURE 5 is a pictorial view of the motor driven ambulatory mechanism of this invention.
Figure 6:
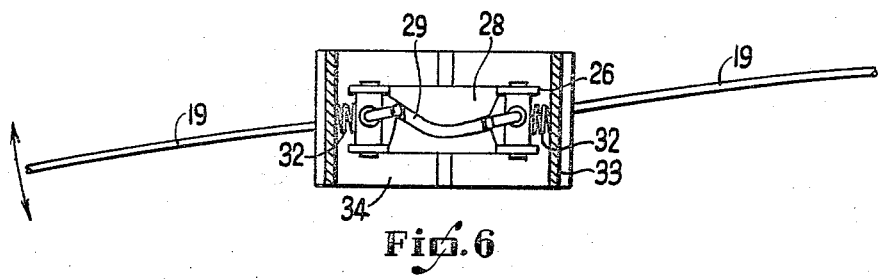
FIGURE 6 is a top view of a portion of an optional form of detail construction of this invention.

Having reference now to the drawing in detail, there is generally indicated by the character 15 a vehicle body in the form of an insect or spider and embodying a rear portion 16 that is the equivalent to the spider's abdomen and a forward portion 17 that equals the spider's cephalothorax in which is located the motor 18 that provides motion to the vehicle's legs 19 through the plurality of gears 20 as clearly shown in FIGURE 5 of the appended drawings.

The aforesaid legs 19 of this invention may be of any desired shape and size in so long as that portion that is attached to the forward portion 17 of the body 15 is vertical for its adaptation to the holder 21 that is swingably secured to the horizontal ledge 22 of the aforesaid forward portion 17 of the invention by means of a pin 23. The holder 21 embodies a hollow vertically supported stem 24 that has its upper end terminating in a U-shaped member 25 (when viewed from the top) that is at right angle to the aforesaid stem 24. Each end of the U-shaped yoke 25 is provided with a free-turning guide wheel 26 that rides against the periphery 27 of the cam 28 which is so contoured as to deliver the desired vertical motion to the leg 19. The cam 28 contains a recess 29 in its periphery 27 in which a follower on the end 30 of the horizontal portion 31 of the leg 19 which extends through the aforesaid support stem 24 and is not only at right angle thereto but also is centrally located between the parallel sides of the aforesaid U-shaped yoke 25, as best shown in FIGURE 5 of the appended drawing.

A compression spring 32 is mounted between the wall 33 of the forward portion 17 of the body 15 of this invention and each one of the vertically supported stems 24 thereby insuring perfect contact at all times between the cams 28 and the free turning wheels 26 and the follower portion of this invention.

Figure 1:
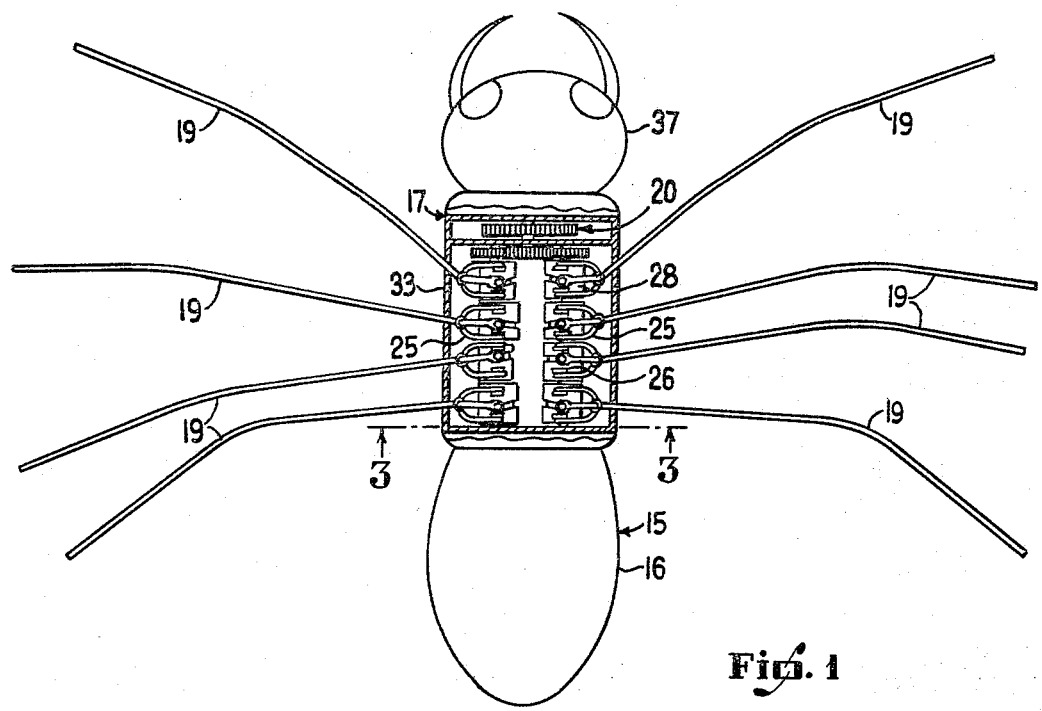
FIGURE 1 is a top view of this invention with the skin broken away to better show its internal mechanism.
Figure 2:
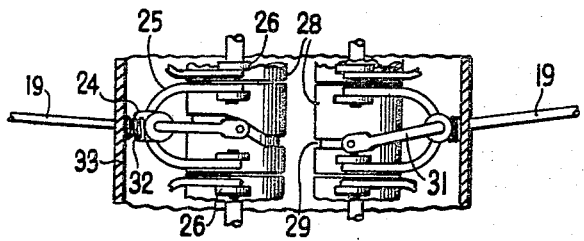
FIGURE 2 is a sectional view taken substantially along line 2—2 of FIGURE 3 as viewed in the direction indicated by the arrows.
Figure 3:
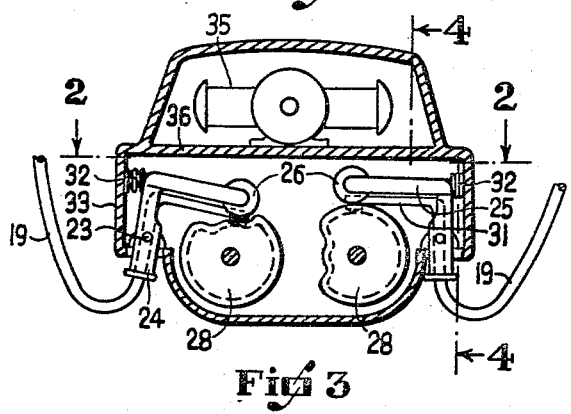
FIGURE 3 is a sectional view taken substantially along line 3—3 of FIGURE 1 as viewed in the direction indicated by the arrows.
Figure 4:
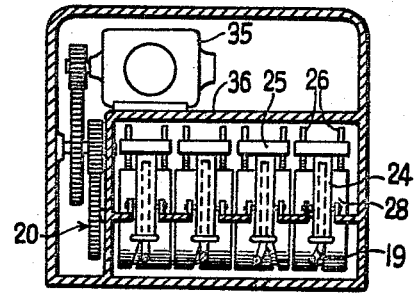
FIGURE 4 is a sectional view taken substantially along line 4—4 of FIGURE 3 as viewed in the direction indicated by the arrows.

The original form of this novel invention calls for two parallel rows of cams 28 as clearly shown in FIGURES 1, 2 and 3 of the appended drawings, while an optional form of this mechanism provides for a single cam 34 operating the leg mechanism of this herein described motor operated ambulatory vehicle that has its motor 18, which may be either electric, as shown in FIGURE 5 of the appended drawings, or an internal combustion engine 35 shown in FIGURE 3. In either case, the motor or engine is mounted on the upper deck 36 of the forward portion 17 of the body 15.

When this novel invention is manufactured for commercial use, passengers, freight or mail is normally carried in the rear portion 16 of the body 15 while the operating crew is housed in the head portion 37. In the event the vehicle is manufactured as a toy, the electric batteries will normally be housed in the rear portion 16 unless the toy is operated by a spring motor as may very well be done in a small economical model of the same.

The construction of this novel invention of a motor operated ambulatory vehicle has now been described and its operation will be as follows.

It is obvious from the description of the construction that the cams 28 are the major parts of this invention as they not only provide a means of transmitting power for its forward motion from the motor or engine but also provide means of steering the vehicle should it be used as a means of transportation. The cams 28 are so contoured that the legs 19 will, as has been stated before, be given vertical motion that will overcome vertical terrain and at the same time the recess 29 in the periphery of the cams 28 will cause the follower located therein to impart a forward motion to the legs 19 by reason of the fact that the aforesaid recess 29 is a spiral one, as clearly shown in FIGURE 2 of the appended drawings. It is this forward (and backward) motion of the legs 19, coupled with their vertical motion, that will impart a forward motion to the vehicle. If the motor or engine is reversed, the legs 19 will naturally go into a reverse direction and back-up the vehicle.

Should this novel vehicle be made to carry passengers, freight or for military use, it will be necessary to replace the gears 20 with a transmission of the type used in endless-track type tractors and tanks whereby the position producing mechanism on each side of the vehicle is manually controlled independent of one another or together according to the desires of the operator of the vehicle. This independent control of the position producing mechanisms on each side of the vehicle which are in this case the legs 19 that cause the vehicle to "walk" make it possible for one to steer the vehicle by either slowing up or down the aforesaid legs 19. When the legs on each side of the body 15 are activated in unison the vehicle will of course travel in a straight line. When all of the legs 19 on one side of the vehicle have been stopped or reversed, and the movement of all of the legs 19 on the other side speeded up the vehicle will turn in a radius that is approximately equal to its own length.

Figure 7:
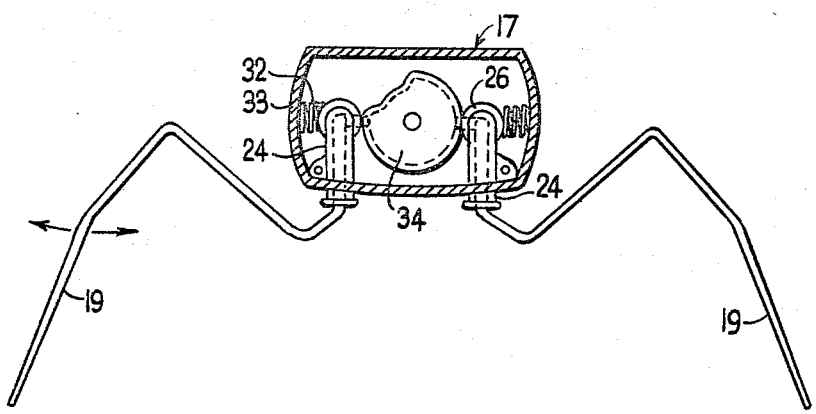
FIGURE 7 is an end view of FIGURE 6.

Should the vehicle be manufactured as a toy, then there will be no real need to provide steering for the same and it can have its drive mechanism constructed as shown in either FIGURES 5 or 7, thus greatly reducing its cost of production.

Many modifications are suggested as one reads this specification such as the use of clutches in its drive mechanism to assist in steering, the changing of the shape and size of its legs 19 depending upon the size and use to which the vehicle is to be put. For example, the invention suggests many uses in the marine construction field where it can be employed to literally walk on the bottom of rivers and harbors and at the same time keep its body 15, from which work can be accomplished many feet above the water.

From the foregoing it will now be seen that there is herein provided a motor operated ambulatory vehicle which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

In accordance with the provisions of the United States Patent Statutes, as stated in the United States Code Title 35, Patents, I have now described the principle of construction and operation of my invention of a motor operated ambulatory vehicle in the form which I personally consider the best embodiment thereof, and what I now claim as my invention and desire to secure by Letters Patent is:

1. A motor-operated ambulatory vehicle of the character described, comprising a body having a bottom and sides, the bottom having a plurality of spaced openings along each side thereof, a supporting tube extending through each opening, pivot means for each tube to permit each tube to pivot in a plane which is transverse to the bottom, a leg which is circular in cross-section extending through each tube, the inner end of each leg being bent at right angles to the tube, the outer end of each leg being bent outwardly and upward and then outwardly and downward, cam and follower means at the inner end of each tube and leg to pivot said supporting tube to press the outer end of said leg down during the major part of each revolution of the corresponding cam and to raise up the outer end of said leg during the remainder of the revolution of said cam, the cam and follower means also pivoting said leg in said tube to pivot the outer end of said leg from front to back during said major portion of said revolution of said cam and to pivot said end of said leg towards the front of the body during the remainder of said revolution.

2. The combination of claim 1 in which the cam surfaces are arranged so that only one leg on each side is moving forward at a time.

3. The combination of claim 1, in which the cam and follower means includes a follower secured to the inner end of each leg and the cam corresponding to each leg has a groove in the form of a spiral and a reverse spiral, the follower extending into said groove, the groove and follower to pivot said leg in said supporting tube, and the bottom of the groove is eccentric to move the follower to pivot the supporting tube about its pivot.

4. The combination of claim 1, in which the cam and follower means includes a follower secured to the inner end of the supporting tube and an eccentric portion of said cam to move said follower to pivot the supporting tube, the cam having a groove with a spiral and a reverse spiral and the inner end of the leg has a follower extending into said groove, the groove and last mentioned follower operating to pivot the leg in the supporting tube.

References Cited

UNITED STATES PATENTS

| | | | |
|---|---|---|---|
| 2,656,904 | 10/1953 | Grenier | 180—6.7 X |
| 2,827,735 | 3/1958 | Grimm | 46—150 |
| 2,918,738 | 12/1959 | Barr | 46—150 |
| 2,996,304 | 8/1961 | Lange | 280—1.181 |
| 3,010,729 | 11/1961 | Tomosy | 280—1.181 |
| 3,204,713 | 9/1965 | Shanahan et al. | 180—6.7 X |

LEO FRIAGLIA, *Primary Examiner.*